US008670946B2

(12) United States Patent
Salazar et al.

(10) Patent No.: US 8,670,946 B2
(45) Date of Patent: Mar. 11, 2014

(54) UTILITY DEVICE MANAGEMENT

(75) Inventors: Ruben Salazar, Johns Creek, GA (US); Jeffrey B. Shudark, Cumming, GA (US); Emmanuel Monnerie, Cumming, GA (US); Stephen J. Chasko, Marietta, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 804 days.

(21) Appl. No.: 12/891,915

(22) Filed: Sep. 28, 2010

(65) Prior Publication Data
US 2012/0078548 A1  Mar. 29, 2012

(51) Int. Cl.
*G06F 17/40* (2006.01)
*G06F 11/30* (2006.01)

(52) U.S. Cl.
USPC ............. 702/62; 324/110; 340/637; 702/187; 702/188; 705/412; 713/150; 713/182; 726/4

(58) Field of Classification Search
USPC ............ 73/432.1, 865.8; 324/72, 73.1, 76.11, 324/103 R, 103 P, 104, 110, 113; 340/500, 340/540, 635, 637, 870.01, 870.02, 870.07, 340/870.16; 370/254; 702/1, 57, 60, 61, 62, 702/127, 187, 188; 705/1.1, 30, 34, 50, 63, 705/400, 412, 413; 709/223, 225; 713/1, 2, 713/100, 150, 182; 726/1, 3, 4, 5, 6, 78, 26, 726/34
IPC ............... G01D 4/00,4/002, 4/004, 4/006, 7/00, G01D 27/00; G06F 11/00, 11/30, 11/3003, G06F 11/3006, 11/3089, 11/32, 17/00, 17/40, G06F 17/60, 19/00, 21/00, 21/30, 221/44, G06F 21/445, 2221/00, 2221/21, 2221/2103; G06Q 10/00, 50/00, 50/06; H04L 9/00, 9/006, H04L 9/12, 9/14, 9/16, 9/32, 9/3234, 9/3271
See application file for complete search history.

(56) References Cited

U.S. PATENT DOCUMENTS 3,351,910 A * 11/1967 Miller et al. ................. 714/47.1
5,293,424 A * 3/1994 Holtey et al. ................. 713/193
(Continued)

FOREIGN PATENT DOCUMENTS

WO  2012047441  4/2012

OTHER PUBLICATIONS

"International Search Report and Written Opinion, 22 pages", PCT/US2011/050845, Jan. 6, 2012.
(Continued)

*Primary Examiner* — Edward Cosimano
(74) *Attorney, Agent, or Firm* — Kilpatrick Townsend & Stockton LLP

(57) ABSTRACT

Methods, systems, and apparatus, including computer programs encoded on a computer storage medium, for managing utility device operations. In one aspect, a utility apparatus includes a processing apparatus that manages data processing tasks for the utility apparatus. The utility apparatus also includes a communications apparatus, coupled to the processing apparatus, that is configured to transmit and receive data over a network. A metrology apparatus is coupled to the processing apparatus, the metrology apparatus being configured to measure and provide meter data that includes at least a measure of utilized utility services. A network apparatus is also coupled to the processing apparatus, the network apparatus being configured to coordinate communication between devices that belong to a home area network. A utility identification module interface is coupled to the processing apparatus, the utility identification module having an interface that removably receives a utility identification module.

25 Claims, 4 Drawing Sheets

(56) References Cited

U.S. PATENT DOCUMENTS

| | | | |
|---|---|---|---|
| 5,699,276 A * | 12/1997 | Roos | 379/106.03 |
| 5,930,773 A * | 7/1999 | Crooks et al. | 705/30 |
| 5,943,656 A * | 8/1999 | Crooks et al. | 705/30 |
| 6,052,671 A * | 4/2000 | Crooks et al. | 705/34 |
| 6,088,688 A * | 7/2000 | Crooks et al. | 705/412 |
| 6,591,229 B1 | 7/2003 | Pattinson et al. | |
| 6,799,272 B1 | 9/2004 | Urata | |
| 7,043,643 B1 * | 5/2006 | Doe et al. | 713/189 |
| 7,302,487 B2 * | 11/2007 | Ylonen et al. | 709/229 |
| 7,480,369 B2 | 1/2009 | Magarasevic et al. | |
| 7,502,933 B2 | 3/2009 | Jakobsson et al. | |
| 7,609,837 B2 | 10/2009 | Bennett | |
| 7,801,510 B2 | 9/2010 | Jung et al. | |
| 8,073,925 B2 | 12/2011 | Wheeler et al. | |
| 8,078,720 B2 | 12/2011 | Kawana | |
| 8,181,262 B2 * | 5/2012 | Cooper et al. | 726/28 |
| 2002/0191548 A1 * | 12/2002 | Ylonen et al. | 370/254 |
| 2004/0088333 A1 | 5/2004 | Sidman | |
| 2006/0026672 A1 | 2/2006 | Braun | |
| 2006/0206433 A1 | 9/2006 | Scoggins | |
| 2007/0022469 A1 * | 1/2007 | Cooper et al. | 726/3 |
| 2008/0177678 A1 | 7/2008 | Di Martini et al. | |

OTHER PUBLICATIONS

PCT/US2011/050845, "International Preliminary Report on Patentability", Apr. 11, 2013, 12 pages.

* cited by examiner

UTILITY DEVICE MANAGEMENT

BACKGROUND

This specification relates to utility end point security, identification, and maintenance.

Utility meters have become integral elements of distributed data networks. For example, utility meters and other utility devices can include transceivers that enable the devices to provide usage data (e.g., data specifying power usage or water usage), network status data (e.g., data specifying network operating characteristics) and other network data to a utility operator. The transceivers associated with these devices also enable the devices to receive configuration data that can be used to maintain proper configuration of the devices and/or control data that can be used to change (remotely) an operation mode of the meter (e.g., remote service disconnect).

Utility meters are also being used to manage home area networks (HANs). For example, a utility meter can be configured to communicate with "smart" devices that communicate according to a specified communications standard (e.g., ZigBee Smart Energy). In turn, the utility meter can store network configuration data and/or device identifiers that are needed to coordinate communication between "smart" devices.

Because utility meters have become integral elements of distributed data networks, it is important that these utility meters be implemented with security features that protect the utility meters and data networks from attack. Additionally, it is also important to reduce the amount of time that a utility meter is out of service following, for example, replacement of the meter and/or a power outage.

SUMMARY

In general, one innovative aspect of the subject matter described in this specification can be embodied in an apparatus that includes a processing apparatus that manages data processing tasks for the utility apparatus; a communications apparatus coupled to the processing apparatus, the communications apparatus being configured to transmit and receive data over a network; a metrology apparatus coupled to the processing apparatus, the metrology apparatus being configured to measure and provide meter data that includes at least a measure of utilized utility services; a network apparatus coupled to the processing apparatus, the network apparatus being configured to coordinate communication between devices that belong to a home area network; and a utility identification module interface coupled to the processing apparatus, the utility identification module having an interface that removably receives a utility identification module, wherein the utility identification module includes at least one processor and a data store that stores configuration data that configures the processing apparatus to communicate with the communications apparatus, the metrology apparatus, and the network apparatus. Other embodiments of this aspect include corresponding systems, methods, and computer programs.

These and other embodiments can each optionally include one or more of the following features. Apparatus can include a removable utility identification module that stores configuration data that are respectively associated with the communications apparatus, the metrology apparatus, and the network apparatus. The configuration data that are associated with the communications apparatus can specify at least an encryption key with which data transmitted to a utility network management apparatus are encrypted. The configuration data that are associated with the metrology apparatus can specify at least a security key that is required to communicate with the metrology apparatus.

The configuration data that are associated with the network apparatus can specify at least a network security key that is required to communicate over the home area network or a neighborhood area network. The configuration data further specify: devices that belong to the home area network; communications settings associated with the home area network, wherein the communications settings specify pairs of devices that are in communication with each other; and security characteristics of the devices that belong to the home area network.

The home area network can be a ZigBee network in which devices communicate according to a ZigBee communications protocol. Each of the respective configuration data can be stored and partitioned according to the apparatus to which the configuration data correspond. The utility identification module can be a secure hardware component.

In general, another aspect of the subject matter described in this specification can be embodied in methods that include the actions of determining, by a utility processing apparatus of a utility apparatus, that the utility processing apparatus requires configuration data to interact with at least one of a metrology apparatus associated with the utility processing apparatus and a network apparatus that is associated with the utility processing apparatus; detecting, by the utility processing apparatus, a removable utility identification module that is in communication with the utility processing apparatus, the utility identification module storing configuration data required by the utility processing apparatus to interact with at least one of the metrology apparatus and the network apparatus; receiving, by the utility processing apparatus and from the utility identification module, the configuration data; and interacting, by the utility processing apparatus, with at least one of the metrology apparatus and the network apparatus using the configuration data. Other embodiments of this aspect include corresponding systems, apparatus, and computer programs, configured to perform the actions of the methods, encoded on computer storage devices.

These and other embodiments can each optionally include one or more of the following features. Receiving the configuration data can include receiving, from the removable utility identification module, encryption data specifying an encryption key that is used to transmit reporting data to a network management apparatus that manages a utility network to which the utility apparatus belongs; and receiving, from the removable utility identification module, routing data that specifies one or more network devices that belong to a same mesh network as the utility apparatus and that are in communication with the utility apparatus. Methods can further include transmitting meter data that is encrypted with the encryption key to a selected network device specified by the routing data.

Receiving routing data can further include receiving geographic data specifying a geographic location of the utility apparatus; and receiving destination data specifying a network identifier associated with the network management apparatus.

Methods can further include receiving, from another apparatus, an authentication challenge requesting a response to the challenge; and providing a response to the authentication challenge. Methods can further include determining, by the other apparatus, that the response to the authorization challenge is a valid response, wherein a valid response is a response that authenticates the utility apparatus as being in a non-tampered state. Methods can further include determining, by the other apparatus, that the valid response was received outside of a threshold response time; and providing, by the other apparatus, tamper data to the network management apparatus reporting receipt of the valid response outside of the threshold response time.

Methods can further include determining, by the other apparatus that the response to the authorization challenge is an invalid response, wherein an invalid response is a response that fails to authenticate the utility apparatus as being in a non-tampered state; and providing, by the other apparatus, tamper data to the network management apparatus reporting receipt of the invalid response. Receiving the configuration data can include receiving, by the utility apparatus processing apparatus and from the utility identification module, home area network data associated with a home area network that is associated with a geographic location of the utility apparatus. Receiving the home area network data can include receiving, from the utility identification module, a set of device identifiers for devices that belong to the home area network, a set of security keys that are used to communicate over the home area network, and security settings for devices that belong to the home area network.

Methods can further include coordinating communication between devices that belong to the home area network. Receiving home area network data can include receiving, from the utility identification module, a network security key for the home area network. Coordinating communication between devices that belong to the home area network can include receiving, from a new device, a request to join the home area network; and providing the network key to the new device in response to the request.

Coordinating communication between devices that belong to the home area network can include coordinating communications between devices that are communicate over the home area network according to a ZigBee communications standard. Receiving the configuration data further can include receiving, by the utility processing apparatus and from the utility identification module, a security key that is required to communicate with the metrology apparatus that is associated with the utility apparatus.

Methods can further include obtaining the meter data, wherein the meter data comprises at least a measure of utilized utility services; and generating a communication packet including the meter data, wherein the communication packet is encrypted using the encryption data.

In general, another aspect of the subject matter described in this specification can be embodied in a system that includes a first end point in a utility network, the first end point having a utility identification module interface that removably receives a first utility identification module, wherein the first utility identification module stores data that is associated with a particular utility account, and wherein the first end point is configured to measure utility service utilization, associate the measure with data specified by the utility identification module that has been removably received by the first end point, and transmit the measures over a utility network; a second end point in the utility network, the second end point having a utility identification module interface that removably receives a second utility identification module, wherein the second utility identification module stores data that is associated with a same particular utility account as the first utility identification module, the second end point is located at a different geographic location from the first end point, the second end point being configured to measure utility service utilization, associate the measure with data specified by the second utility identification module, and transmit the measures over the utility network; a network management apparatus in communication with the first end point and the second end point, the network management apparatus being configured to receive the measures from the first end point and the second end point and associate the measures with the same particular utility account based on the measures being respectively associated with the data specified by the first utility identification module and the second utility identification module. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Utility meters can be configured more quickly by using a removable utility identification module that stores the configuration data for the meter instead of obtaining the configuration data over a utility network. Meter security is enhanced by using encryption and/or challenge/response techniques to restrict access to metrology apparatus, communications apparatus, and/or home network apparatus that are implemented in the meter. Meter exchange (i.e., meter swap-out) processes are simplified because data required by a newly installed meter (or another utility apparatus) is available from a utility module that was removed from the previously installed meter. Data identifying a meter as a Trust Center for a home area network can be stored in the utility identification module rather than fixed components of the meter. Periodic determination of a tamper state of a utility meter reduces the likelihood of unauthorized access and fraudulent activity.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Utility meters are configured to receive a removable utility identification module that securely store configuration data that is required for the utility meter to provide meter data (e.g., data specifying power usage) and coordinate communications over a home area network ("HAN") and/or a neighborhood area network ("NAN"). As described below, the configuration data can include, for example, encryption keys, passwords, network identifiers, HAN and/or NAN communications setting, initial routing settings, security settings for devices that belong to the home area network, and other data (e.g., user account data) that is used by the meter to provide meter data and coordinate communications over a HAN and/or a NAN. The utility identification modules are configured to provide the configuration data in response to verifying that the configuration data is being provided to a device (or user)

that is authorized to receive the data. For example, the utility identification modules can be configured to implement challenge response techniques, utilize various encryption techniques, or otherwise require the device requesting the configuration data to verify that it is authorized to receive the configuration data. Additionally, a tamper state for each endpoint that includes a utility identification module can be determined using challenge/response techniques that are initiated, for example, by other endpoints that are located near the endpoint or a network management apparatus.

Figure 1:
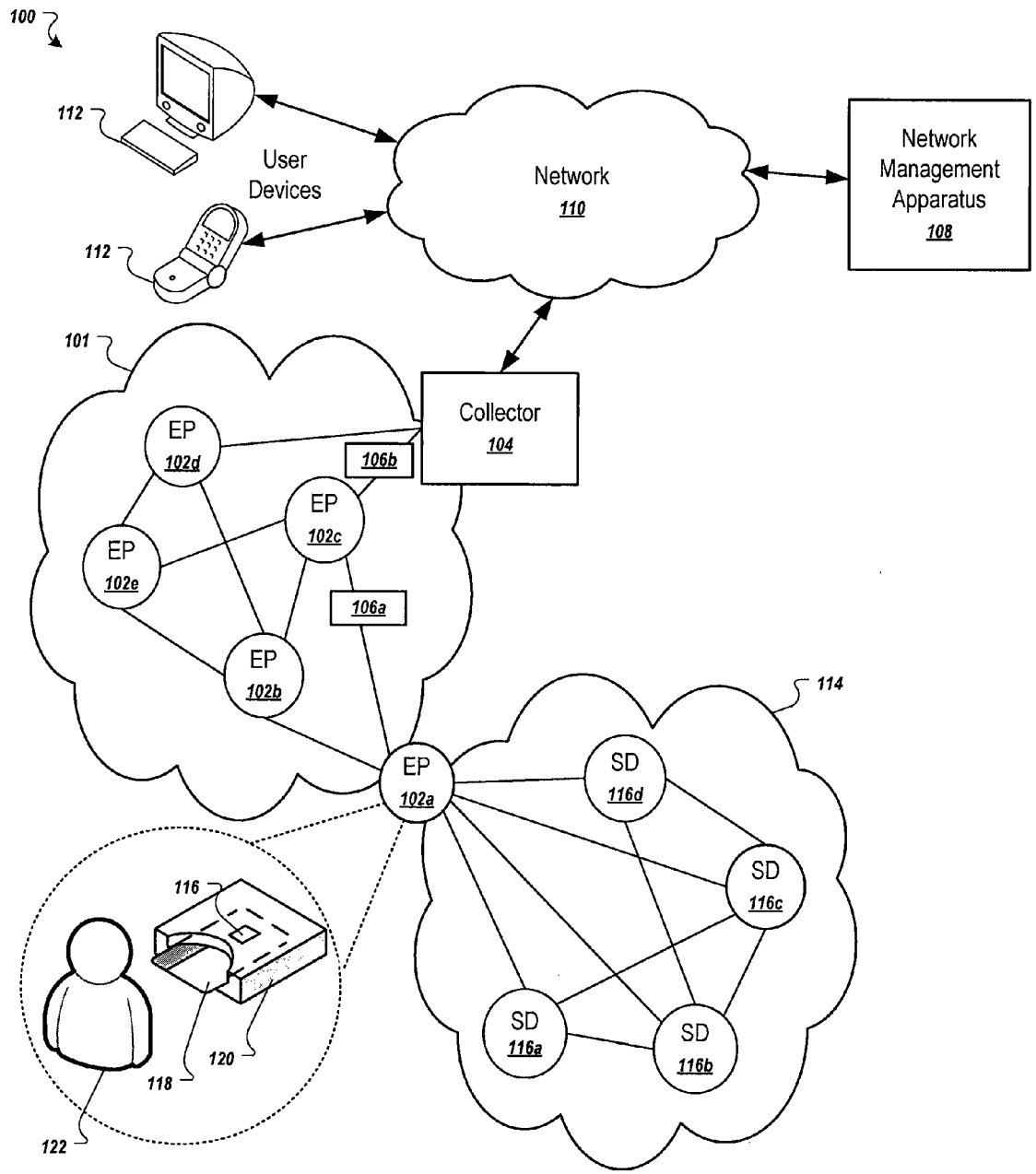
FIG. 1 is an example environment in which utility identification modules can be implemented.

FIG. 1 is an example environment 100 in which utility identification modules can be implemented. The network environment 100 includes a utility network 101 in which a plurality of end points 102a, 102b, 102c, 102d and 102d (hereinafter also referenced as end points 102) are coupled (e.g., communicatively coupled) to a collector 104. The end points 102 can be any device that includes a transmitter, receiver, or transceiver capable of communicating over the utility network 101. For example, the end points 102 can be utility meters (or other utility devices such as switches, transformers, or capacitor banks), computing devices, or other devices that transmit data in the utility network 101. End points 102 or other network components that are implemented in and/or are enabled to communicate over a specified network are referred to as belonging to the network.

The description that follows refers to the end points 102 as power meters that belong to a power distribution network. However, the description that follows is applicable to other types of end points 102 that belong to utility networks or other networks. For example, the description that follows is applicable to gas meters and water meters that are respectively installed in gas and water distribution networks.

The end points 102 monitor and report various operating characteristics of the service network 101, including measures of utility utilization. For example, when the end points 102 are implemented as power meters in a power distribution network, the end points 102 report measures of utilized utility services by providing meter data that specify measures of total power consumption, power consumption over a specified period of time, peak power consumption, instantaneous voltage, peak voltage, minimum voltage and other measures of related to power consumption and power management (e.g., load information). The meter data can also include status data that specifies a status of the power meter (e.g., operating in a normal operating mode, emergency power mode, or another state such as a recovery state following a power outage). In gas and water distribution networks, meters can measure similar characteristics that are related to gas and water usage (e.g., total flow and pressure).

In some implementations, symbols 106a and 106b including the meter data that represent the measures of utility utilization (e.g., data representing measures of power consumption and/or status data) are continuously or intermittently transmitted over the utility network 101. Each symbol 106a or 106b can include data from a single endpoint or data from multiple endpoints. For example, symbol 106a may include data only from endpoint 102a, while symbol 106b may include the data from endpoint 102a as well as data from endpoint 102c.

The end points 102 transmit the symbols 106a and 106b over communications channels. Communications channels are portions of spectrum over which data are transmitted. The center frequency and bandwidth of each communications channel can depend on the communications system in which they are implemented.

In some implementations, the communications channels for utility meters (e.g., power, gas and/or water meters) are channels of a wireless mesh network. In these implementations, each of the endpoints 102 transmits data over a specified radio frequency channel. Each of the endpoints 102 in a mesh network is also configured to receive data from other endpoints 102 and retransmit that data towards a destination (e.g., collector 104 or network management apparatus 108) over the communications channels. For example, each of the endpoints 102a-102e is communicatively coupled to at least one other endpoint 102 in the utility network 101, and each endpoint 102 can transmit data to, and/or receive data from, other end points 102 to which the endpoint 102 is coupled.

Each of the endpoints 102 can transmit symbols 106a and 106b through the network 101 using routing data. Routing data specify one or more network devices that belong to the same mesh network as a particular endpoint and are in direct communication with the particular endpoint. In some implementations the endpoints 102 maintain the routing data using a routing table that specifies a list of endpoints 102 and other network devices with which the endpoint 102 can communicate. For example, endpoint 102a is communicatively coupled to endpoints 102b and 102c. In this example, endpoint 102a can maintain a routing table that includes references (e.g., serial numbers or other end point identifiers) that are associated with the end points 102b and 102c. When end point 102a is ready to transmit symbol 106a through the utility network 101, end point 102a can access its routing table to select a end point 102 that is to receive the symbol 106a. In turn, the end point can encode and/or append data to the symbol specifying the end point 102 that is to receive the symbol 106a. The endpoints 102 can encrypt the symbols 106a and 106b that are transmitted through the utility network 101 to prevent access by third parties.

Endpoints 102 can also be implemented in a power line communication (PLC) network that dynamically allocates available bandwidth according to an orthogonal frequency division multiple access (OFDMA) spectrum allocation technique or another channel allocation technique (e.g., Time Division Multiple Access, Code Division Multiple Access, and other Frequency Division Multiple Access techniques). In these implementations, the endpoints transmit data using the same conductors (e.g., power lines) over which power are transmitted. Endpoints 102 that are implemented in a PLC network can also maintain a routing table to specify network elements that should receive data transmitted by the endpoints 102 and can also use encryption techniques to secure the data being transmitted.

In FIG. 1, end points 102a-102e transmit symbols 106a and 106b over communications channels to the collector 104. The collector 104 is a data processing apparatus that receives symbols 106a and 106b from the end points 102a-102e and transmits data representing the symbols 106a and 106b to a network management apparatus 108 over a data network 110. For example, the collector 104 can be a router, a server, or another data processing apparatus is configured to receive the symbols 106a and 106b and either retransmit the symbols 106a and 106b over the data network 110, or create new data packets that include data from the symbols 106a and 106b (e.g., consolidated packets that include data from two or more symbols 106a and 106b) and transmit those new data packets over the data network 110. While only one collector 104 is shown, the utility network 101 can include many different collectors 104 that can each communicate with many thousands of endpoints 102.

The data network 110 can be a wide area network (WAN), local area network (LAN), the Internet, or any other communications network. The data network 110 can be implemented as a wired or wireless network. Wired networks can include any media-constrained networks including, but not limited to, networks implemented using metallic wire conductors, fiber optic materials, or waveguides. Wireless networks include all free-space propagation networks including, but not limited to, networks implemented using radio wave and free-space optical networks.

In some implementations, the data network 110 couples the collector 104 to the network management apparatus 108. The network management apparatus 108 is a data processing apparatus that monitors and/or controls the utility network 101. The network management apparatus 108 can control different characteristics of the utility network 101 based on data received from end points 102 that are installed in the service network 101.

For example, in a power distribution network, the network management apparatus 108 can receive data indicating that power usage is significantly higher in a particular portion of a power network than in other portions of the power network. Based on this data, the network management apparatus 108 can allocate additional resources to that particular portion of the network (i.e., load balance) or provide data to a user device 112 specifying that there increased power usage in the particular portion of the power network.

The network management apparatus 108 can provide data from the symbols 106a and 106b to a user device 112 that can be accessed, for example, by a network operator, maintenance personnel and/or customers. For example, data identifying the increased power usage described above can be provided to a user device 112 accessible by the network operator, who can, in turn, determine an appropriate action regarding the increased usage. Additionally, data identifying a time-of-use measure and/or a peak demand measure can also be provided to the user device 112. Similarly, if there has been a power outage, the network management apparatus 112 can provide data to user devices 112 that are accessible by customers to provide information regarding the existence of the outage and potentially provide information estimating duration of the outage.

The environment 100 also includes a home area network 114. A home area network is a network over which residential and/or commercial "smart devices" communicate. The home area network 114 includes "smart devices" 116a-116d that are configured to communicate with other smart devices that belong to the home area network 114. Smart devices can include computers, printers, lighting systems, heating and cooling systems, security systems, as well as sensors and other devices. For example, devices 116a and 116c can be sensors (e.g., motion detectors, acoustic sensors, temperature sensors, or other sensors) that are installed in a house (or business) that detect, for example, environmental conditions in the house. In turn, these sensors can transmit data representing the environmental conditions over the home area network 114. A lighting system 116b and/or cooling system 116d can receive the data, and in response to receiving the data, adjust the settings (e.g., turning off lights and/or adjusting the thermostat settings) of those systems. For example, if the data specifies that motion has been detected in the house, the lighting system can turn lights on at a location at which the motion was detected.

To facilitate communications between the different smart devices 116a, 116b, 116c and 116d that are installed in the home area network 114, each of the smart devices 116a-116d can transmit and receive data according to a specified communication protocol. For example, each of the devices 116a-116d of FIG. 1 can transmit data according to the ZigBee compliant protocol, so that the other devices of the home area network 114 that are configured to communicate over the home area network 114 can receive the data and take action in response to receipt of the data.

An endpoint 102a can belong to the utility network 101, a neighborhood area network (not shown), and the home area network 114. Therefore, the endpoint 102a can transmit data through the utility network 101, the neighborhood area network, as well as the home area network 114 (e.g., according to the ZigBee or other specified communications protocols). For example, as described above, the endpoint 102a can measure utility services that have been utilized at a location at which the endpoint 102a is installed, and transmit symbols 106a and 106b that report the measures of utilized utility services over the utility network 101. Additionally, the endpoint 102a can be a coordinator for the home area network 114 (or the NAN) and facilitate communications over the home area network 114 (or over the NAN).

A coordinator of a home area network is a data processing apparatus that manages communications over the home area network. The coordinator of a home area network stores home area network data associated with the home area network such as a network key for the network, a set of device identifiers, security settings (e.g., encrypted or non-encrypted communications required), and security keys (i.e., encryption keys and/or passwords) for devices that belong to the home area network, passwords, and other information that is required to facilitate communications over a home area network. Because the coordinator can store configuration data associated with each of the devices (e.g., devices 116a-116d) that belong to the home area network, the coordinator can operate as a trusted party that receives a request for a security key that is required to communicate with a particular smart device, verify that the requestor is authorized to communicate with the particular smart device, and provide the security key to the requestor in response to the verification. Additionally, the coordinator can limit access to passwords or other credentials that are required to communicate with, access, and/or otherwise interact with the smart devices 116a-116d.

A coordinator of a network area network is a data processing apparatus that manages communications over the neighborhood area network. The coordinator of the NAN can store neighborhood area network data associated with the NAN such as a network key for the network, a set of device identifiers specifying which endpoints (or other communications devices) are authorized to communicate over the NAN, security settings for the NAN, network passwords, and security keys for the NAN.

It is desirable for configuration data (e.g., data specifying security keys and other data related to security such as encryption techniques and communications settings) to be stored at a secure location so that access to this data is limited to devices that have been determined to be authorized to access the data. For example, endpoints 102 can utilize encryption techniques and other security technologies (e.g., certificate authentication techniques) to securely store configuration data in a data store of the endpoint.

It is also desirable for the configuration data to be readily available to facilitate communications over the home area network 114. For example, assume that devices 116a and 116b are trying to communicate with each other over the home area network 114 and/or that the endpoint 102a is a power meter that is required to provide a measure of power usage every 10 minutes. Further assume that the endpoint 102a was recently installed (e.g., to replace another endpoint 102 that was the coordinator of the home area network 114), and that the endpoint 102a downloads configuration data required to communicate over the utility network 101 and the home area network 114 from the management apparatus 108.

In this example, the endpoint 102 may not be able to transmit symbols 106a and 106b over the utility network 101 or coordinate communications over the home area network until the download the configuration data from the network management apparatus 108 is complete. Thus, meter data (e.g., specifying measures of power utilization) will not be provided to the network management apparatus 108 and communications over the home area network 114 will not occur until the download of the configuration data is complete. Further, if the home area network data (i.e., configuration data for the home area network) is not available from the network management apparatus 108, communications over the home area network 114 can be further delayed until the endpoint 102a is provided the home area network data (e.g., until the home area network is manually reconfigured).

For example, when a new utility meter is installed to replace a previously installed utility meter, the configuration of the utility meter generally requires configuration data to be downloaded, and some level of manual configuration of the utility meter. Thus, when a new utility meter is installed, the utility meter may not be able to communicate over the utility network, the NAN, or the HAN, for a relatively long period of time.

To reduce the time during which meter data and/or communications over the home area network are unavailable, a removable utility identification module 116 is used to store configuration data for an endpoint 102. The removable utility identification module 116 is a data processing apparatus that stores data in a secure manner. For example, the UIM can be a secure hardware device that stores data that are used to facilitate secure transfer of data over communications networks. The UIM can also securely store data that are used to prevent unauthorized access to a metrology apparatus and/or a HAN/NAN apparatus. The UIM can be installed at a secured location (e.g., within an endpoint) or with security devices (e.g., locking mechanisms) that prevent unauthorized access to the UIM. Additionally, some or all of the data stored on the UIM can be encrypted or otherwise protected from being accessed by unauthorized devices.

Storing the configuration data on a removable utility identification module 116 enables the configuration data from a particular endpoint to be transferred to a new endpoint without requiring the new endpoint to download the configuration data from a network management apparatus 108, and without requiring reconfiguration of the new endpoint as the coordinator of the home area network 114.

For example, when the particular endpoint is removed, the removable utility identification module 116 is removed from the particular endpoint by an authorized technician 122 and placed in the new endpoint. Once the new endpoint is activated (e.g., powered on), the new endpoint will have access to the configuration data that is stored on the utility identification module 116. Thus, the new endpoint will be able to communicate over the utility network 101 and coordinate communications over the home area network 114 using the configuration data, while maintaining the security of the configuration data.

As described in more detail below, the configuration data that is stored on the utility identification module can include configuration data that is required for the endpoint to interact with at least one of a communications apparatus, a metrology apparatus, and a network apparatus. For example, the utility identification module can store communications settings, such as PHY/MAC settings (e.g., a list of frequencies over which communications are to be transmitted), routing data (e.g., routing tables that specify endpoint and/or access point addresses such as collector addresses) and encryption keys that are required to communicate over the utility network, security keys (e.g., passwords) that are required to interact with a metrology apparatus that provides meter data, and/or a network key for a home area network, a set of smart devices that belong to the home area network, and security keys and characteristics of the smart devices. The utility identification module can also store account data specifying a user account (e.g., account number and/or geographic location of the endpoint) with which the endpoint is associated.

The removable utility identification module 116 can be, for example, an ISO/IEC 7816 smart card that is configured to utilize encryption techniques (e.g., AES 256 or a public/private key pair) to secure the data. The utility identification module can have a punch-out form factor (e.g., an ID0 form factor) and be placed into a utility identification module interface (e.g., an electrical interface socket) of an endpoint 102. Alternatively, the utility identification module can be resident on a larger card 118 and removably received by a utility identification module interface 120 of the endpoint 102a (e.g., a meter and/or a HAN coordinator) that includes a card slot and electrical contact points that connect to the utility identification module 116. In some implementations, the utility identification module interface 120 can be secured (e.g., inside the endpoint) to limit access to the utility identification module 116 (e.g., limit access to authorized technicians or other authorized individuals).

Particular utility identification module 116/utility identification module interface 120 configurations are provided for purposes of example, but other configurations can be used. For example, a contactless smart card can be used as a utility identification module, and a contactless smart card interface can be used as the utility identification module interface. Similarly, the utility identification module can be implemented in a processing apparatus that interfaces with a USB port of the endpoint 102a.

Figure 2:
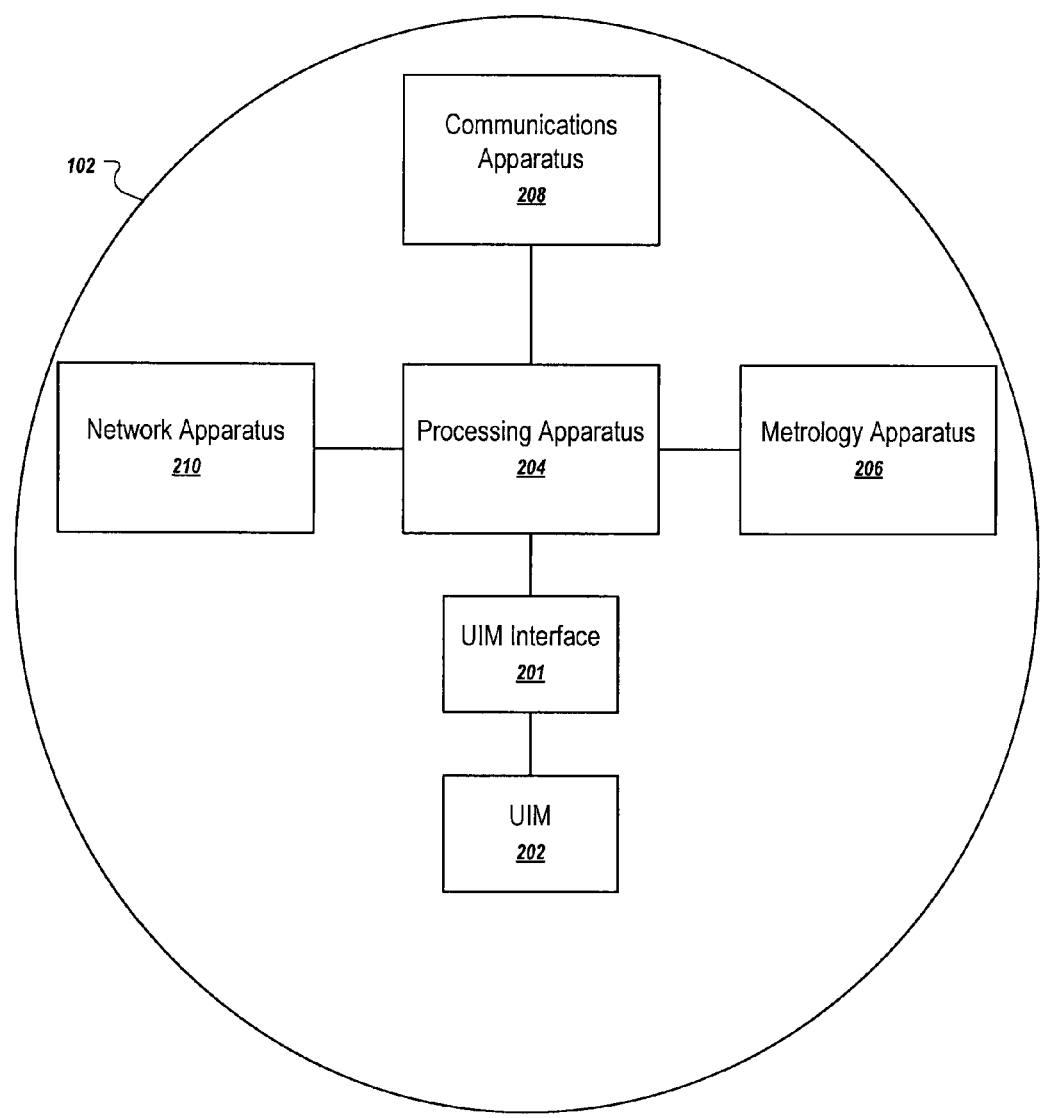
FIG. 2 is a block diagram of an endpoint that includes a utility identification module interface.

FIG. 2 is a block diagram of an endpoint 102 that includes a utility identification module interface 201. The endpoint 102 includes a utility meter processing apparatus 204 that manages data processing tasks performed by the endpoint 102, controls communications between components of the endpoint 102, and controls communications transmitted and/or received by the endpoint 102. As described in more detail below, the processing apparatus 204 is also responsible for controlling access to secure data that is stored in the utility identification module. The processing apparatus is coupled to the utility identification module interface 201. The utility identification module interface 201 removably receives, interfaces with, and/or couples to a user identification module 202 that stores configuration data that the processing apparatus 204 uses to manage data processing tasks for the endpoint 102, as described below.

The processing apparatus 204 is coupled to a metrology apparatus 206 that is a data processing apparatus that is configured to measure and provide meter data that specifies measures of utilized utility services. As described above the meter data can include, for example, measures of total power consumption, power consumption over a specified period of time, peak power consumption, instantaneous voltage, peak voltage, minimum voltage and other measures of related to power consumption and power management (e.g., load information). The meter data can also include status data that specifies a status of the power meter (e.g., operating in a normal operating mode, emergency power mode, or another state such as a recovery state following a power outage).

When the endpoint 102 is scheduled (or requested) to provide meter data, for example, to a utility operator, the processing apparatus 204 requests the meter data from the metrology apparatus 206. In some implementations, the request for the meter data can require execution of a metrology application (or script) that, upon execution, causes the metrology apparatus to provide the requested meter data. To prevent fraudulent activity (e.g., meter tampering), execution of the metrology application can be restricted to authenticated users by using, for example, a password or other access restriction techniques (e.g., challenge/response verification).

Passwords (or other data) required to cause execution of the metrology application (or otherwise access the meter data) can be stored in the UIM 202, such that the processing apparatus 204 can be required to request the password from the UIM 202. Requests for data from the UIM 202 can also be restricted to authenticated devices (or users). Therefore, the request can include data (e.g., an authenticated certificate, a valid response to a security challenge, or a password) that demonstrates that the processing apparatus is authorized to receive the data being requested. In response to determining that the processing apparatus 204 is authorized to receive the requested data, the UIM 202 provides the requested data (e.g., meter data) to the processing apparatus.

Once the processing apparatus 204 has received the meter data from the metrology apparatus 206, the processing apparatus 204 provides the meter data to a communications apparatus 208 that is coupled to the processing apparatus 204. The communications apparatus 208 is a data processing apparatus that is configured to transmit and receive data over a network (e.g., a utility network). For example, the communications apparatus 208 can receive meter data provided by the processing apparatus 204, generate symbols that include the meter data, and transmit the symbols over a utility network to which the endpoint 102 belongs. The communications apparatus 208 can encrypt the meter data that is included in the symbols to prevent access to the data by third parties. For example, the communications apparatus 208 can encrypt the meter data using AES, a public/private key pair, or another encryption technique using keys that are stored in the UIM 202.

Encryption of the meter data can be performed by the processing apparatus, or using keys provided by the processing apparatus. For example, the communications apparatus 208 can request that the processing apparatus encrypt meter data for transmission. Alternatively, the communications apparatus can request that the processing apparatus obtain keys necessary to encrypt the data from the UIM 202, and the communications apparatus 208 can perform the encryption using the keys provided by the processing apparatus.

In some implementations, encryption and/or transmission of data by the communications apparatus 208 is performed in response to execution of a metrology application (or script) that, upon execution, causes the communications apparatus 208 to encrypt and/or transmit data over the utility network. To prevent fraudulent activity (e.g., meter data tampering or fraudulent access to the utility network), execution of the communications application (or other control of, or access to, the communications apparatus 208) can be restricted to authenticated devices (or users) by using, for example, a password or other access restriction techniques (e.g., challenge/response verification), similar to those described above.

For example, to control the communications apparatus 208, the processing apparatus 204 can be required to provide a password or otherwise verify that the processing apparatus 204 is authorized to control the communications apparatus 208. In some implementations, the processing apparatus 204 can also be required to specify transmission characteristics for the data being transmitted. For example, the communications apparatus 208 can require the processing apparatus 204 to specify encryption technique with which the data is to be encrypted as well as routing information (i.e., an identifier for at least one network component that is to receive the transmitted data).

As described above, passwords or other data required to enable the processing apparatus 204 to verify that it is authorized to control the communications apparatus 208 can be stored in the UIM 202. The UIM 202 can also store encryption data that specifies an encryption key that is used to transmit data to a network management apparatus that manages the utility network to which the endpoint 102 belongs. Additionally, the UIM 202 can store routing data that specifies one or more network devices that belong to the same mesh network as the endpoint 102 and are in direct communication with the endpoint 102. The processing apparatus 204 can obtain the data required to cause the communications apparatus 208 to transmit the meter data from the UIM 202 in a manner similar to that described above.

The processing apparatus 204 is also coupled to a network apparatus 210. The network apparatus 210 is a data processing apparatus that is configured to coordinate communication between devices that belong to a same home area network (e.g., a same ZigBee network) and/or a same neighborhood area network as the network apparatus 210. For example, the network apparatus 210 can interact with devices (e.g., smart devices 116a-116d of FIG. 1) to determine whether the devices are members of a same home area network as the network apparatus 210, whether a pair of specific devices are authorized to communicate over the home area network, and/or provide data required for devices to communicate with each other over the home area network. The network apparatus 210 can also interact with devices that belong to a same neighborhood area network as the network apparatus 210 and/or determine whether a particular device is authorized to transmit data over the network area network.

In some implementations, home area network data (i.e., data that are required to facilitate communications over the home area network) and/or neighborhood area network data (i.e., data that are required to communicate over a neighborhood area network) are stored in the UIM 202. For example, the UIM 202 can store data specifying a network key for the home area network (or NAN), a set of devices that belong to the home area network (or the NAN), routing tables that are associated with the home area network (or the NAN), pairs of devices that are authorized to communicate with each other, and/or security characteristics of the devices that belong to the home area network (or the NAN). Other data associated with the home area network (or NAN) can also be stored in the UIM 202.

The network apparatus 210 can obtain the home area network data and/or neighborhood area network data from the UIM 202 (e.g., through the processing apparatus 204) to coordinate communications between devices in the home area network and over the neighborhood area network in a manner similar to that described above. For example, in response to a request from one device to communicate with another device, the network apparatus 210 can request that the processing apparatus 204 obtain and provide the data necessary to confirm that the two devices are authorized to communicate as well as the data necessary to facilitate communications between the two devices (e.g., security keys associated with the devices).

As described above, the UIM 202 stores configuration data that are respectively used to gain access and/or control operation of the metrology apparatus 206, communications apparatus 208, and network apparatus 210. In some implementations, the UIM 202 can store the configuration data for each of these respective apparatus in separate partition portions of memory, where access to each partition of memory is restricted using different passwords and/or different restriction techniques. For example, access to a password associated with the metrology apparatus 206 can be granted by the UIM 202 in response to receipt of a particular response to a security challenge, while access to a list of devices that belong to the home area network can be granted in response to another response to another different security challenge. Partitioning the data keys in this manner further secures the configuration data associated with each respective component of the endpoint 102. For example, the partitioning limits access to configuration data to devices (or users) that have provided data required to access the particular partition in which configuration data for a particular component of the endpoint 102 are stored.

In some situations, the amount of time required to obtain the configuration data from the UIM 202 may exceed a response time within which the processing apparatus 204 is required to obtain and/or provide data to one of the metrology apparatus 206, communications apparatus 208, and/or network apparatus 210. To reduce the time required to obtain the configuration data, the processing apparatus can include a data store (e.g., Random Access Memory) in which particular configuration data can be temporarily stored. Storing configuration data in a data store of the processing apparatus 204 can decrease the time required for the processing apparatus 204 to obtain the data because the memory access times of the data store can be much lower than the time required to obtain the data from the UIM 202. Because the configuration data is sensitive information, the processing apparatus 204 can be required to periodically interact with the UIM 202, another endpoint, and/or a network management apparatus) to verify that the endpoint 102 is not in a tampered state, as described in more detail below.

The UIM 202 can be configured to perform all computations and processing necessary to secure the configuration data that is stored on the UIM 202. For example, the UIM 202 can include a random number generator that is used to facilitate challenge/response authentication techniques. The UIM 202 can also include a processor that is configured to encrypt the configuration data that is provided to the processing apparatus 204. For example, the UIM 202 can include a processor that is configured to implement a private/public key encryption technique, symmetric key encryption techniques, and/or asymmetric key encryption techniques. Further, each UIM 202 can be configured to operate with one particular end point 102 through a pairing process, and the pairing of the UIM 202 and endpoint 102 can require authentication. For example, at power-up (or periodically), the processing apparatus 204 may receive a request from the UIM 202 and/or a network management apparatus to provide data that verifies the proper pairing of the UIM 202 to the endpoint 102. The data provided can be, for example, a hash result of a serial number of the end point, a response to an authentication challenge, or other authentication data.

In some implementations, more than one UIM 202 can be associated with a particular user account. For example, one UIM 202 can be designated to be installed at a fixed location (e.g., at the address at which a particular power meter is installed), while the other UIM can be authorized to be used in a designated set of other endpoints that are at other locations (i.e., at locations different than a location associated with the user account). Both of these UIMs can include data that is associated with the same utility account (e.g., electric company account) and can be configured to measure power utilization. Therefore, each of the UIMs can be installed at separate endpoints to obtain measures of power usage at the endpoints, associate the measures of power usage at each of the endpoints with the same utility account, and provide the measures of power usage, for example, to a network management apparatus so that the account with which the UIMs are associated can be charged for the usage at the two different locations. For example, one UIM can be required to be installed at an endpoint that is at the address that is associated with the user account, while the second UIM can be authorized to be used in electric vehicles in order to track power consumption when the electric vehicle is connected to charging stations or other charging locations that are not located at the address associated with the user account.

A UIM 202 can be configured to store all of the data described above and used as a universal UIM that can be used in any endpoint. Alternatively, only portions of the data described above can be stored on a UIM 202 that may be used in a specified set of endpoints. For example, a particular UIM can be configured to operate exclusively in a NAN device (e.g., a utility device that operates in the NAN), such that this particular UIM may only include meter data and data necessary to communicate over the NAN, but not include customer account information. In another example, another UIM may be configured to operate exclusively in a HAN device (e.g., devices within a home or a meter at the home), such that this other UIM may only include data specifying customer account information and data necessary to communicate over the HAN.

Figure 3:
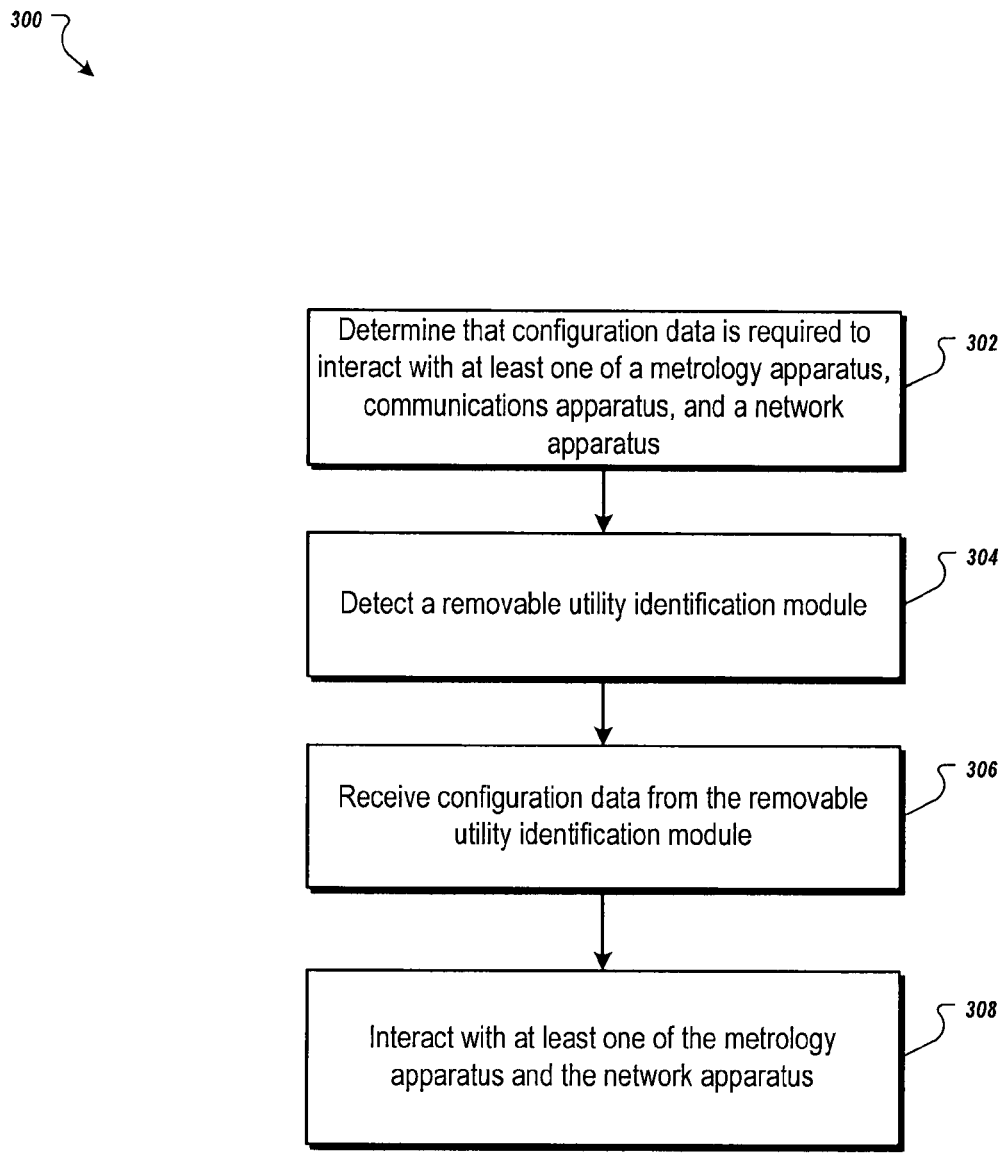
FIG. 3 is a flowchart of an example process for configuring a utility meter.

FIG. 3 is a flowchart of an example process 300 for configuring a utility meter. The process 300 is a process by which a utility meter processing apparatus determines that configuration data is required to interact with specified apparatus, and detects a removable utility identification module that is in communication with the utility meter processing apparatus. The utility meter processing apparatus receives the required configuration data from the utility identification module. In turn, the utility meter processing apparatus interacts with the specified apparatus.

The process 300 can be for performed, for example, by the endpoints 102 of FIG. 1. The process can also be implemented as instructions stored on computer storage medium such that execution of instructions by data processing apparatus caused the data processing apparatus to perform the operations of the process 300.

A determination is made that configuration data is required to interact with at least one of a metrology apparatus, communications apparatus, and a network apparatus (302). In some implementations, the determination can be made by a utility meter processing apparatus of a utility meter. The determination can be made, for example, by determining that current configuration data does not match configuration data that is required to interact with the metrology apparatus and/or the network apparatus. For example, the determination can be made that a password or other data that is required to access, control, or otherwise interact with the network apparatus and/or the metrology apparatus is not included in the current configuration data.

A removable utility identification module is detected (304). In some implementations, the removable utility identification module is a data processing apparatus, such as a smart card, that is in communication with utility meter processing apparatus. For example, the removable utility identification module can be a smart card that is electrically connected to a utility identification module interface of the utility meter. The utility identification module stores configuration data required by the utility meter processing apparatus interact with at least one of the metrology apparatus and a network apparatus. The utility identification module can also store configuration data required by the utility meter processing apparatus interact with a communications module that controls transmission of data through a utility network to which the utility meter belongs.

In some implementations, the removable utility identification module is detected during a startup sequence of a utility meter. For example, when the utility meter is powered on the utility meter processing apparatus can determine whether a utility identification module is electrically connected to the utility meter (e.g., installed in a utility identification module interface). In other implementations, the utility identification module is detected upon insertion of the utility identification module into a facility identification module interface. For example, while a utility meter is powered on, a utility identification module can be inserted into a utility identification module interface, and insertion of the utility identification module can be detected.

Configuration data is received from the removable utility identification module (306). In some implementations, the configuration data is received in response to a request by the utility meter processing apparatus. For example, in response to determining that configuration data is required and about a removable utility identification module has been detected, the processing apparatus can provide a request for the configuration data to the utility identification module.

In some implementations, the request for configuration data includes data specifying that the processing apparatus is authorized to receive the configuration data. For example, the request can include a password, an authorized certificate, or data that has been encrypted according to a private key that is shared between the processing apparatus and the utility identification module.

In other implementations, in response to the request, the utility identification module can respond to the request with a security challenge and request that the processing apparatus provide a valid response in order to receive the requested configuration data. For example, the utility identification module can generate a random number, provide that number to the processing apparatus, and request that the processing apparatus computers and provide a hash (or a result of another function) of the random number. If the hash of the random number that is provided by the processing apparatus matches an expected hash of the random number that has been computed by the utility identification module, then the utility identification module will provide the requested configuration data to the processing apparatus. However, if the hash of the random number that is provided by the processing apparatus does not match the expected hash, the utility identification module will refuse to provide the requested configuration data, and the utility identification module can increment a security counter that represents a number of potential security breaches and/or potential attacks that have been detected.

In some implementations, configuration data for different apparatus can be stored in different memory partitions. In these implementations, access to the configuration data for each particular apparatus can be limited to devices (or users) that have demonstrated that they are authorized to access the configuration data for the particular apparatus (e.g., by providing a unique password or other unique data required to access the configuration data for the particular apparatus).

As described above, configuration data can include passwords, security keys, and other data that is required to interact with a network apparatus, a metrology apparatus, and/or communications apparatus. The configuration data that is received can also include encryption data that specifies an encryption key that is used to transmit meter data to a network management apparatus that manages the utility network to which the utility meter belongs. The configuration data that is received can further include routing data that specifies one or more network devices that belong to the same mesh network as the utility meter and that are in direct communication with utility meter, data that specifies the geographic location of the utility meter that is transmitting, data as well as destination data specifying a network identifier (e.g., an Internet Protocol address) associated with a network device to which the data is being transmitted (e.g., network management apparatus).

Using the encryption key and routing data, the processing apparatus can cause transmission of meter data that is encrypted with the encryption key to a network device that is selected from the routing data. For example, the processing apparatus and/or a communications apparatus can encrypt the data using the encryption key and select, from the routing data, an endpoint, router, repeater or another network device to which the meter data is to be transmitted. The selection can be made, for example, based on a distance of the selected network device from the utility meter transmitting the data as well as a quality of the transmission path between the utility meter and the network device (e.g., based on signal to noise ratio, distance, and other factors).

At least one of the metrology apparatus and the network apparatus are interacted with (308). Once the processing apparatus has received the configuration data, the processing apparatus can use the configuration data to interact with the network apparatus and/or the metrology apparatus. For example, the processing apparatus can provide home area network data to the network apparatus, thereby facilitating communication between devices in the home area network. The home area network data can include, for example, a set of device identifiers for devices that want to be home area network, a set of data keys that are used to communicate over the home area network, and/or security settings for devices that belong to the home area network.

Additionally, the processing apparatus can use the configuration data to receive meter data from the metrology apparatus. For example, the processing apparatus can provide a password (or other data specifying the processing apparatus is authorized to receive the meter data) that was received in the configuration data to the metrology apparatus and receive the meter data in response. Further, the processing apparatus can use the configuration data to cause the meter data to be transmitted over a utility network. For example, processing apparatus can interact with a communications apparatus that is coupled to the processing apparatus to encrypt meter data and transmit the meter data to a network management apparatus.

Figure 4:
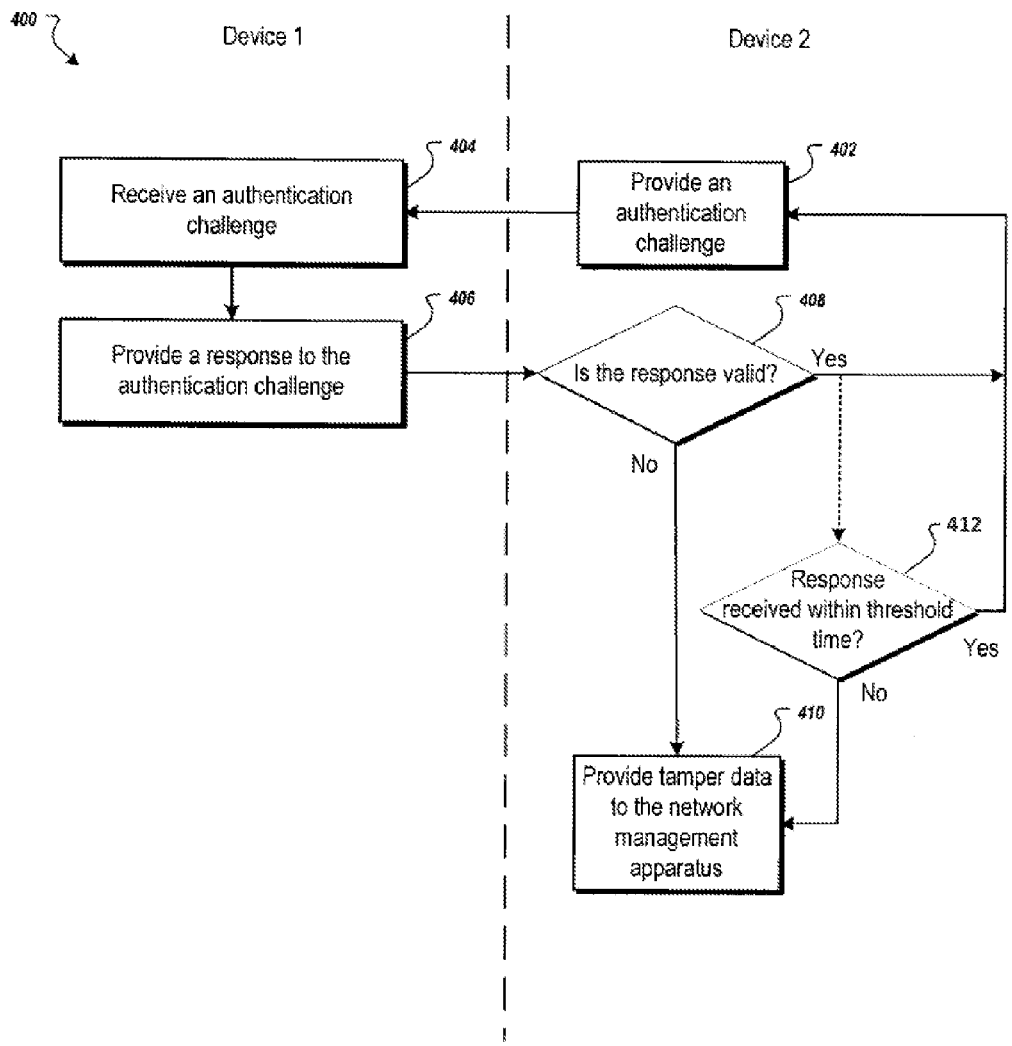
FIG. 4 is a flowchart of an example process for determining a tamper state of a utility meter.

FIG. 4 is a flowchart of an example process 400 for determining a tamper state of a utility meter. The process 400 is a process by which a first meter provides an authentication challenge to a second meter. The second meter receives the authentication challenge and provides, to the first meter, a response to the authentication challenge. The first meter determines whether the response is valid, and optionally if the response was received within a threshold time. If the response is not valid or the response was not received within the threshold time, the first meter provides tamper data to the network management apparatus. If the response is valid and optionally received within the threshold time, the first meter provides another authentication challenge at a later time.

The process 400 can be for performed, for example, by the endpoints 102 of FIG. 1. The process can also be implemented as instructions stored on computer storage medium such that execution of instructions by data processing apparatus caused the data processing apparatus to perform the operations of the process 400.

A first meter provides an authentication challenge to a second meter (402). In some implementations, the first meter provides a random number to the second meter and requests that the second meter provide a hash result (or a result of another function) that authenticates the second meter. Other challenge/response techniques can also be used (e.g., passwords).

The second meter receives the authentication challenge (404) and provides a response to the authentication challenge (406). In some implementations, the response can be generated using a response application that resides on a removable utility identification module that is associated with the second meter. For example, the response application can generate a hash result of the random number and provide that result for transmission back to the first meter.

The first meter receives the response and determines whether the response is valid (408). A valid response is a response that authenticates the second utility meter as being in a non-tampered state. For example, a valid response can be a response that matches the expected response and/or is received within a specified threshold time of an expected time, as described below. In some implementations, the determination of whether the response is a valid response can be made by comparing the response to an expected response that has been computed by the first meter. For example, the first meter can generate an expected hash result using the random number that was provided to the second meter. When the hash result is received from the second meter, it is compared to the expected hash result that was computed by the first meter. If the hash result and the expected hash result match, the response is a valid response. Otherwise, the response is not a valid response.

If the first meter determines that the response is not a valid response, tamper data is provided to the network management apparatus (410). Tamper data is data specifying that a particular meter has failed an authentication challenge. The tamper data can include, for example, identifiers that respectively identify the meter that provided the authentication challenge and the meter that provided the response and data specifying a reason for providing the tamper data. For example, the tamper data can specify that a response hash result did not match an expected hash result and/or that the response was received outside of a threshold time, as described below.

If the first meter determines that the response is a valid response, the first meter can provide another authentication challenge (402), for example, at a later time or on demand (i.e., in response to instructions to initiate a challenge). In some implementations, the first meter can determine whether the valid response was received within a threshold response time (412). The threshold response time is an amount of time around an expected response time during which a valid response authenticates the second meter being in a non-tampered state. For example, the threshold response time can be set to 10% of an average (or another statistical measure) amount of time between transmission of the challenge and receipt of the response. In this example, a valid response received at a time that is within +/−10% of the average time authenticates the meter as being in a non-tampered state. However, if a valid response is received outside of +/−10% of the average time, the valid response does not authenticate the meter as being in a non-tampered state.

When a valid response was received within the threshold response time, the first meter can provide another authentication challenge (402), for example, at a later time or on demand. When the valid response was received outside of the threshold response time, tamper data can be provided to the network management apparatus, as described above.

In some implementations, the process 400 or similar processes can be used to verify the integrity of the software or firmware that is installed in an endpoint. For example, in response to a challenge (or periodically) a UIM that is installed in an endpoint can generate a software/firmware signature (e.g., a hash result using data associated with the firmware and a provided random number) and compare the signature to a current valid signature. If the signature does not match the current valid signature tamper data can be provided to a network management apparatus or a tamper counter (i.e., a counter that represents a number of potential security attacks on the endpoint) can be incremented.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A utility apparatus, comprising:

a processing apparatus that manages data processing tasks for the utility apparatus;

a communications apparatus coupled to the processing apparatus, the communications apparatus being configured to transmit and receive data over a network;

a metrology apparatus coupled to the processing apparatus, the metrology apparatus being configured to measure and provide meter data that includes at least a measure of utilized utility services;

a network apparatus coupled to the processing apparatus, the network apparatus being configured to coordinate communication between devices that belong to a home area network; and a utility identification module interface coupled to the processing apparatus, the utility identification module having an interface that removably receives a utility identification module, wherein the utility identification module includes at least one processor and a data store that stores configuration data that configures the processing apparatus to communicate with the communications apparatus, the metrology apparatus, and the network apparatus.

2. The utility apparatus of claim 1, wherein the utility identification module is a secure hardware component.

3. The utility apparatus of claim 1, further comprising a removable utility identification module that stores configuration data that are respectively associated with the communications apparatus, the metrology apparatus, and the network apparatus.

4. The utility apparatus of claim 3, wherein the configuration data that are associated with the communications apparatus specify at least an encryption key with which data transmitted to a utility network management apparatus are encrypted.

5. The utility apparatus of claim 3, wherein the configuration data that are associated with the metrology apparatus specify at least a security key that is required to communicate with the metrology apparatus.

6. The utility apparatus of claim 3, wherein each of the respective configuration data are stored and partitioned according to the apparatus to which the configuration data correspond.

7. The utility apparatus of claim 3, wherein the configuration data that are associated with the network apparatus specify at least a network security key that is required to communicate over the home area network or a neighborhood area network.

8. The utility apparatus of claim 7, wherein the configuration data further specify:
- devices that belong to the home area network;
- communications settings associated with the home area network, wherein the communications settings specify pairs of devices that are in communication with each other; and
- security characteristics of the devices that belong to the home area network.

9. The utility apparatus of claim 7, wherein the home area network is a ZigBee network in which devices communicate according to a ZigBee communications protocol.

10. A method, comprising:
- determining, by a utility processing apparatus of a utility apparatus, that the utility processing apparatus requires configuration data to interact with at least one of a metrology apparatus associated with the utility processing apparatus and a network apparatus that is associated with the utility processing apparatus;
- detecting, by the utility processing apparatus, a removable utility identification module that is in communication with the utility processing apparatus, the utility identification module storing configuration data required by the utility processing apparatus to interact with at least one of the metrology apparatus and the network apparatus;
- receiving, by the utility processing apparatus and from the utility identification module, the configuration data; and
- interacting, by the utility processing apparatus, with at least one of the metrology apparatus and the network apparatus using the configuration data.

11. The method of claim 10, wherein:
receiving the configuration data comprises:
- receiving, from the removable utility identification module, encryption data specifying an encryption key that is used to transmit reporting data to a network management apparatus that manages a utility network to which the utility apparatus belongs; and
- receiving, from the removable utility identification module, routing data that specifies one or more network devices that belong to a same mesh network as the utility apparatus and that are in communication with the utility apparatus; and further comprising transmitting meter data that is encrypted with the encryption key to a selected network device specified by the routing data.

12. The method of claim 11, wherein receiving routing data further comprises:
- receiving geographic data specifying a geographic location of the utility apparatus; and
- receiving destination data specifying a network identifier associated with the network management apparatus.

13. The method of claim 10, further comprising:
- receiving, from another apparatus, an authentication challenge requesting a response to the challenge; and
- providing a response to the authentication challenge.

14. The method of claim 13, further comprising:
- determining, by the other apparatus that the response to the authorization challenge is an invalid response, wherein an invalid response is a response that fails to authenticate the utility apparatus as being in a non-tampered state; and
- providing, by the other apparatus, tamper data to the network management apparatus reporting receipt of the invalid response.

15. The method of claim 13, further comprising determining, by the other apparatus, that the response to the authorization challenge is a valid response, wherein a valid response is a response that authenticates the utility apparatus as being in a non-tampered state.

16. The method of claim 15, further comprising:
- determining, by the other apparatus, that the valid response was received outside of a threshold response time; and
- providing, by the other apparatus, tamper data to the network management apparatus reporting receipt of the valid response outside of the threshold response time.

17. The method of claim 10, wherein receiving the configuration data comprises receiving, by the utility apparatus processing apparatus and from the utility identification module, home area network data associated with a home area network that is associated with a geographic location of the utility apparatus.

18. The method of claim 17, wherein receiving the home area network data comprise receiving, from the utility identification module, a set of device identifiers for devices that belong to the home area network, a set of security keys that are used to communicate over the home area network, and security settings for devices that belong to the home area network.

19. The method of claim 17, further comprising coordinating communication between devices that belong to the home area network.

20. The method of claim 19, wherein:
- receiving home area network data comprises receiving, from the utility identification module, a network security key for the home area network; and
- coordinating communication between devices that belong to the home area network comprises:
  - receiving, from a new device, a request to join the home area network; and
  - providing the network key to the new device in response to the request.

21. The method of claim 19, wherein coordinating communication between devices that belong to the home area network comprises coordinating communications between devices that are communicate over the home area network according to a ZigBee communications standard.

22. The method of claim 19, wherein receiving the configuration data further comprises receiving, by the utility processing apparatus and from the utility identification module, a security key that is required to communicate with the metrology apparatus that is associated with the utility apparatus.

23. The method of claim 22, further comprising:
- obtaining the meter data, wherein the meter data comprises at least a measure of utilized utility services; and
- generating a communication packet including the meter data, wherein the communication packet is encrypted using the encryption data.

24. A system, comprising:
- a first end point in a utility network, the first end point having a utility identification module interface that removably receives a first utility identification module, wherein the first utility identification module stores data that is associated with a particular utility account, and wherein the first end point is configured to measure utility service utilization, associate the measure with data specified by the utility identification module that has been removably received by the first end point, and transmit the measures over a utility network;
- a second end point in the utility network, the second end point having a utility identification module interface that removably receives a second utility identification module, wherein the second utility identification module stores data that is associated with a same particular utility account as the first utility identification module, the second end point is located at a different geographic location from the first end point, the second end point being configured to measure utility service utilization, associate the measure with data specified by the second utility identification module, and transmit the measures over the utility network;

a network management apparatus in communication with the first end point and the second end point, the network management apparatus being configured to receive the measures from the first end point and the second end point and associate the measures with the same particular utility account based on the measures being respectively associated with the data specified by the first utility identification module and the second utility identification module.

25. The method of claim 24, wherein measures received from the first end point and the second end point that are associated with the same particular utility account are measures for utility utilization that occurred at a same time.

* * * * *